United States Patent Office 3,267,181
Patented August 16, 1966

3,267,181
PHOSPHORODITHIOATES
Ernst Beriger, Allschwil, Switzerland, assignor to Ciba Limited, Basel, Switzerland, a company of Switzerland
No Drawing. Filed Feb. 21, 1961, Ser. No. 90,635
Claims priority, application Switzerland, Feb. 24, 1960, 2,076/60
8 Claims. (Cl. 260—943)

This invention provides new organic phosphorus compounds of the formula $$\begin{array}{c} RO \\ \diagdown \\ R_1O \diagup \underset{X}{\overset{\|}{P}} -S-R_4-CON \diagup \overset{R_3}{\diagdown R_2} \end{array} \quad (1)$$

in which R and $R_1$ each represent an alkyl, cycloalkyl, aralkyl, aryl or heterocyclic radical which may contain substituents, and in the case of an alkyl radical it may be interrupted by at least one oxygen atom, $R_2$ represents an alkyl or alkyl-aryl radical interrupted by at least one oxygen atom, $R_3$ represents a hydrogen atom, an alkyl radical or the same radical as $R_2$ represents, $R_4$ represents one of the groups $-CH_2-$, $-CH_2-CH_2-$ and $$\begin{array}{c} -CH- \\ | \\ R_5 \end{array}$$

in which $R_5$ represents a lower alkyl radical, and X represents a sulfur or oxygen atom.

The new compounds are valuable agents for combating pests, especially harmful insects and acarides. They are active against the various stages of development, such as eggs, larvae and imagines, and they act as contact and stomach poisons. Especially valuable as insecticides are compounds of the formula $$\begin{array}{c} RO \\ \diagdown \\ R_1O \diagup \underset{X}{\overset{\|}{P}} -S-R_4CONHR_2 \end{array} \quad (II)$$

in which R and $R_1$ each represent an alkyl radical containing 1 to 4 carbon atoms, and advantageously a methyl or ethyl radical, $R_4$ has the meaning given above, $R_2$ represents a radical of the formula $$-\left[C_mH_{2m}O\right]_p-C_nH_{2n+1}$$

or of the formula $$-\left[C_mH_{2m}O\right]_p-\!\!\!\!\bigcirc$$

in which $m$, $n$ and $p$ each represent a whole number from 1 to 4, and especially a methoxy ethyl, ethoxy ethyl, propoxy ethyl, butoxy ethyl or phenoxy ethyl radical and X represents an oxygen or sulfur atom.

The invention also provides a process for the manufacture of the above new compounds, wherein a compound of the formula $$\begin{array}{c} RO \\ \diagdown \\ R_1O \diagup \underset{X}{\overset{\|}{P}} -SMe \end{array} \quad (III)$$

in which R, $R_1$ and X have the meanings given above, and Me represents a cation, especially an alkali metal ion, is condensed with a compound of the formula $$Hal-R_4-CON\diagup \overset{R_3}{\diagdown R_2} \quad (IV)$$

in which $R_2$, $R_3$ and $R_4$ have the meanings given above and Hal represents a halogen atom, such as bromine or chlorine.

The compounds of the Formula III used as starting materials are advantageously dialkyl esters of dithio phosphoric acid or of thiol-phosphoric acid of which the alkyl radicals contain 1 to 4 carbon atoms and the carbon chain of the alkyl radicals may be interrupted by at least one oxygen atom, or alkali metal salts of these esters.

The compounds of the general Formula IV are amides of monohalogenated monocarboxylic acids. The radical $R_2$ may be an alkyl or alkyl-aryl radical interrupted by at least one ether-oxygen bridge, and especially a radical of the formula $$-\left[C_mH_{2m}O\right]_p-C_nH_{2n+1}$$

or of the formula $$-\left[C_mH_{2m}O\right]_p-\!\!\!\!\bigcirc$$

in which $m$, $n$ and $p$ each represent a whole number from 1 to 4. It is advantageously an alkoxyalkyl group of low molecular weight, such as a methoxy ethyl, alkoxy ethyl, propoxy ethyl, butoxy ethyl or phenoxy alkyl group, such as the phenoxy ethyl group. The radical $R_3$ may represent a hydrogen atom or an alkyl radical advantageously containing 1 to 4 carbon atoms, such as the methyl group.

Among the reactants of the Formula IV there may be mentioned, for example:

Chloracetic acid 2-methoxyethylamide,
Chloracetic acid 2-phenoxyethylamide,
Chloracetic acid 2-ethoxyethylamide,
Chloracetic acid 2:2-diethoxyethylamide,
Chloracetic acid 2′-methoxy-2-ethoxyethylamide,
α-Bromopropionic acid methoxyethylamide and
β-Bromopropionic acid-methoxyethylamide.

For making the compounds of the invention the reaction components are reacted within a relatively wide temperature range, for example, at 0 to 110° C. and advantageously about 10° C. to 90° C. It may be advantageous or convenient to use an inert solvent, such as an alcohol or a ketone, for example, acetone, methanol or water and, if desired, to work in an atmosphere of an inert gas, for example, under nitrogen, and/or under reduced pressure.

A further advantageous form of the process for making the compounds of the general Formula 1 consists in reacting the starting materials in a two-phase system consisting of water and an organic solvent, for example, methylene chloride, in which the relative proportions of the two phases may vary within relatively wide limits.

The compounds of the Formula 1 can also be made by reacting a compound of the formula $$\begin{array}{c} RO \\ \diagdown \\ R_1O \diagup \underset{X}{\overset{\|}{P}} -S-R_4-COOR_6 \end{array} \quad (V)$$

in which R, $R_1$, $R_4$ and X have the meanings given above, and $R_6$ represents a lower alkyl radical, with a compound of the formula $$H-N\diagup \overset{R_3}{\diagdown R_2} \quad (VI)$$

in which $R_2$ and $R_3$ have the meanings given above.

As stated above, the compounds of the invention are valuable agents for combating pests, and they are more especially insecticides and acaricides.

Accordingly, the invention also provides preparations for combating pests, which comprise as active substance a compound of the invention in admixture with a liquid or solid diluent. The compounds used are advantageously those of the general Formula II.

A very wide variety of objects or materials can be protected against pests, including harmful insects and acarides and as carriers for the active substances there may be used gaseous, liquid or solid substances. As such objects or materials to be protected or to be used as carriers there may be mentioned, for example, air, especially in rooms, or liquids, for example, the water in ponds, and finally any dead or living substrate, for example, objects in living rooms, cellars, attics or stables, and also pelts, feathers, wool or the like, and living organisms of the plant or animal kingdom in all their various stages of development, provided that they are insensitive to the pest combating agents.

The combating of pests is carried out by the usual methods, for example, by treating the object or material to be protected with the active compound in the form of vapour, for example, as a fumigant, or in the form of a dusting preparation or spraying preparation, for example, a solution or suspension which may be prepared with water or a suitable organic solvent, for example, alcohol, petroleum, a tar distillate or the like. There may also be used aqueous solutions or aqueous emulsions of organic solvents which contain the active substances, for brushing, spraying or immersion of the objects or materials to be protected.

The spraying or dusting preparations may contain the usual inert fillers or marking agents, for example, kaoline, gypsum or bentonite, or other additions, such as sulfite cellulose waste liquor, cellulose derivatives or the like, and also the usual wetting or adherent agents for improving the wetting capacity and adherence of the preparations. The pest combating preparations may be in powder form, in the form of aqueous dispersions or pastes, or in the form of self-dispersing oils.

The compounds can be used singly in a pest combating preparation or in conjunction with other insecticides or fungicides. The use of such preparations in plant protection is carried out by the usual spraying, pouring dusting or fumigating methods.

The new compounds are distinguished by their surprisingly low toxicity towards warm blooded animals.

The following examples illustrate the invention the parts and percentages being by weight unless otherwise stated and the relationship of parts by weight to parts by volume being the same as that of the kilogram to the liter.

*Example 1*

A solution of 19.8 parts of the sodium salt of dimethyldithiophosphoric acid in 40 parts by volume of acetone is treated at room temperature with a solution of 16.55 parts of chloracetic acid methoxypropylamide (melting at 30 to 31° C.) in 20 parts by volume of acetone. The mixture is stirred for 1 hour at room temperature and then for 3 hours longer at 40 to 45° C., the precipitated sodium chloride is filtered off, and the filtrate is evaporated in vacuo at 40° C. The residue is taken up in 50 parts by volume of methylenechloride and washed with 10 parts by volume of water and then with 10 parts by volume of sodium carbonate solution. The solution is dried over sodium sulfate and evaporated in vacuo at 50° C. As residue there are obtained 20.3 parts of a mobile oil of the formula

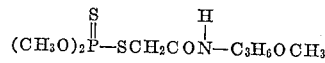

Melting point: 43–44° C.
*Analysis.*—Calcd.: P, 10.78%. Found: P, 10.50%.
Toxicity:
Mouse; per os—
  LD$_{50}$=300 parts per million
  LD$_{100}$=500 parts per million
Rat; per os—LD$_{50}$=610 parts per million.

*Example 2*

22.9 parts of the sodium salt of diethyldithiophosphoric acid are reacted with 16.55 parts of chloroacetic acid methoxypropylamide as described in Example 1, to yield 27.8 parts of a crystalline compound of the formula

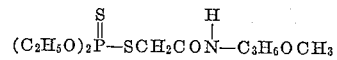

Melting point: 40° C.
*Analysis.*—Calculated: P, 9.82%. Found: P, 10.1%.

*Example 3*

19.8 parts of the sodium salt of dimethyldithiophosphoric acid are reacted with 15.15 parts of chloracetic acid methoxyethylamide (melting at 28 to 29° C.) as described in Example 1, to yield 20.1 parts of a compound of the formula

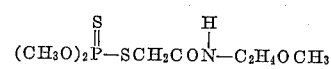

*Analysis.*—Calculated: P, 11.34%. Found: P, 11.2%.

*Example 4*

22.9 parts of the sodium salt of diethyldithiophosphoric acid are reacted with 15.2 parts of chloroacetic methoxyethylamide as described in Example 1, to yield 28.1 parts of a compound of the formula

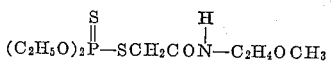

*Analysis.*—Calculated: P, 10.28%. Found: P, 10.3%.

*Example 5*

19.8 parts of the sodium salt of dimethyldithiophosphoric acid are reacted with 16.55 parts of chloroacetic acid-N-methyl-N-methoxyethylamide (boiling at 75 to 83° C. under a pressure of 0.01 mm. Hg) as described in Example 1, to yield 25.6 parts of a compound of the formula

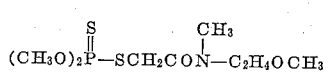

*Analysis.*—Calculated: P, 10.78%. Found: P, 11.0%.

*Example 6*

(a) As described in Example 1, 22.9 parts of the sodium salt of diethyldithiophosphoric acid are reacted with 16.55 parts of chloroacetic acid-N-methyl-N-methoxyethylamide, to yield 30.7 parts of a compound of the formula

*Analysis.*—Calculated: P, 9.82%. Found: P, 9.8%.

(b) As described in Example 1, 15.2 parts of chloroacetic acid methoxyethylamide are reacted with 19.8 parts of the potassium salt of dimethylthiophosphoric acid, to yield 22.3 parts of a compound of the formula

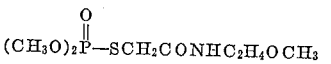

which can be distilled in a high vacuum.
Boiling point: 133–135° C. under a pressure of 0.12 mm. Hg.
*Analysis.*—Calculated: S, 12.46%. Found: S, 11.9%.

(c) As described in Example 1, 13.8 parts of chloroacetic acid methoxymethylamide (boiling at 86–89° C. under a pressure of 0.14 mm. Hg) are reacted with 19.8 parts of the sodium salt of dimethyldithiophosphoric acid by stirring for 28 hours at room temperature, to yield 16.5 parts of a compound of the formula

Melting point: 43–44° C.
*Analysis.*—Calculated: P, 11.95%. Found: P, 11.6%.

(d) As described in Example 1, 13.8 parts of chloroacetic acid methoxymethylamide are reacted with 22.9 parts of the sodium salt of diethyldithiophosphoric acid by being stirred for 28 hours at room temperature, to yield 25.3 parts of a compound of the formula

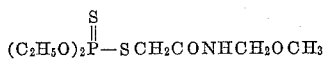

*Analysis.*—Calculated: P, 10.78%. Found: P, 10.74%.

Example 7

(a) A solution of 21 parts of β-bromopropionic acid methoxyethylamide (melting at 40 to 42° C.) and 19.8 parts of the sodium salt of dimethyldithiophosphoric acid in 30 parts of water is stirred for 20 hours at room temperature. 50 parts by volume of methylenechloride are added and the water is separated. The methylenechloride solution is washed with 10 parts of water and then with 10 parts by volume of saturated sodium bicarbonate solution, dried over sodium sulfate and evaporated in vacuo at 40 to 50° C. to yield 21.65 parts of a compound of the formula

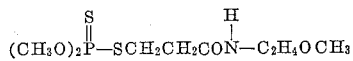

*Analysis.*—Calculated: P, 10.78%. Found: P, 10.1%.

(b) When the indicated salts of the dithiophosphoric acid esters are reacted as described above, the compounds 1 to 8 shown in the following Table I are obtained:

*Analysis.*—Calculated: P, 8.57%. Found: P, 7.5%.

(c) By reacting chloracetic acid - 2:2 - diethoxyethylamide with the sodium salt of dimethyldithiophosphoric acid the compound of the formula

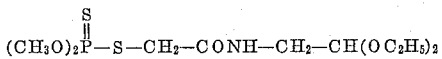

*Analysis.*—Calculated: P, 9.35%. Found: P, 9.14%.

(d) By reacting chloroacetic acid - 2:2 - diethoxyethylamide with sodium salt of diethyldithiophosphoric acid the compound of the formula

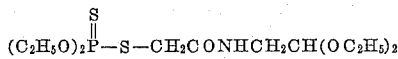

*Analysis.*—Calculated: P, 8.62%. Found: P, 8.56%.

Example 9

A solution of 25.8 parts of 0:0-diethyldithiophosphoryl acetic acid methyl ester in 30 parts by volume of benzene is refluxed at the boil for 3 hours with 8.9 parts of methoxy-propylamine. After cooling, the solution is washed successively with 5 parts by volume of water, 5 parts by volume of 2 N-hydrochloric acid and 5 parts

TABLE I

| Comp. No. | Dithiophosphoric acid ester | Halogen acid amide | Condensation product | Analysis |
|---|---|---|---|---|
| 1 | $(CH_3O)_2\overset{S}{\overset{\|}{P}}-S-Na$ | $Br-\overset{CH_3}{\overset{\|}{CH}}-CONHC_2H_4OCH_3$ | $(CH_3O)_2\overset{S}{\overset{\|}{P}}S-\overset{CH_3}{\overset{\|}{CH}}CONHC_2H_4OCH_3$ | P calc: 10.78%. P found: 9.6%. |
| 2 | $(C_2H_5O)_2\overset{S}{\overset{\|}{P}}-S-Na$ | $Br-\overset{CH_3}{\overset{\|}{CH}}-CONHC_2H_4OCH_3$ | $(C_2H_5O)_2\overset{S}{\overset{\|}{P}}S-\overset{CH_3}{\overset{\|}{CH}}CONHC_2H_4OCH_3$ | P calc: 9.82%. P found: 9.8%. |
| 3 | $(CH_3O)_2\overset{S}{\overset{\|}{P}}-S-Na$ | $Cl-CH_2CONHC_2H_4-O-\langle\rangle$ | $(CH_3O)_2\overset{S}{\overset{\|}{P}}-S-CH_2CONHC_2H_4O-\langle\rangle$ | P calc: 9.24%. P found: 9.9%. |
| 4 | $(CH_3O)_2\overset{S}{\overset{\|}{P}}-S-Na$ | $ClCH_2CON(C_2H_4OCH_3)_2$ | $(CH_3O)_2\overset{S}{\overset{\|}{P}}-S-CH_2CON(C_2H_4OCH_3)_2$ | P calc: 9.35%. P found: 9.42%. |
| 5 | $(CH_3O)_2\overset{S}{\overset{\|}{P}}-S-Na$ | $ClCH_2CONHC_2H_4OC_2H_4OCH_3$ | $(CH_3O)_2\overset{S}{\overset{\|}{P}}-S-CH_2CONHC_2H_4OC_2H_4OCH_3$ | P calc: 9.76%. P found: 9.6%. |
| 6 | $(C_2H_5O)_2\overset{S}{\overset{\|}{P}}-S-Na$ | $ClCH_2CONHC_2H_4OC_2H_4OCH_3$ | $(C_2H_5O)_2\overset{S}{\overset{\|}{P}}-S-CH_2CONH-C_2H_4OC_2H_4OCH_3$ | P calc: 8.97%. P found: 8.69%. |
| 7 | $\begin{matrix}CH_3O\\(CH_3)_2CHO\end{matrix}\overset{S}{\overset{\|}{P}}-S-Na$ | $ClCH_2CONHC_2H_4OCH_3$ | $\begin{matrix}CH_3O\\(CH_3)_2CHO\end{matrix}\overset{S}{\overset{\|}{P}}-S-CH_2CONHC_2H_4OCH_3$ | P calc: 10.28%. P found: 9.7%. |
| 8 | $(C_2H_5O)_2\overset{S}{\overset{\|}{P}}-S-Na$ | $ClCH_2CON(C_2H_4OCH_3)_2$ | $(C_2H_5O)_2\overset{S}{\overset{\|}{P}}-SCH_2CON(C_2H_4OCH_3)$ | P calc: 8.62%. P found: 8.53%. |

Example 8

(a) A mixture of 15.5 parts of chloroacetic acid methoxyethylamide and 29 parts of the potassium salt of methylcyclohexyl-dithiophosphoric acid is stirred for 4 hours at a slight boil in the 2-phase system water/methylenechloride (80 parts by volume) and then worked up as described in Example 7, to yield 19.5 parts of a compound of the formula

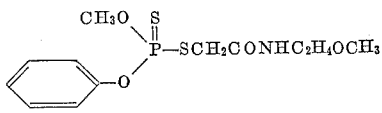

*Analysis.*—Calculated: P, 9.08%. Found: P, 8.2%.

In a similar manner there is obtained (b) By reacting chloroacetic acid methoxyethylamide with the potassium salt of bis-methoxyethyl-dithiophosphoric acid the compound of the formula

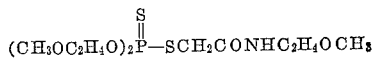

by volume of saturated sodium bicarbonate solution. The benzene is then evaporated in vacuo and the starting material is removed in a high vacuum at 140° C., to leave as residue 10 parts of a compound of the formula

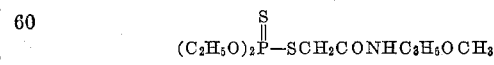

which, according to its melting point and analysis, is identical with the compound obtained in Example 2.

Melting point: 40° C.

*Analysis.*—Calculated: P, 9.82%; N, 4.44%. Found: P, 10.1%; N, 4.2%.

Example 10

While being thoroughly stirred for 2 hours at 0° C., 23 parts of O:O-dimethyldithiophosphoryl acetic acid methyl ester are treated with 12.7 parts of a solution of 71% strength of methoxyethylamine in water. The whole is stirred for another 24 hours at 0° C., 50 parts by volume of methylenechloride are then added, whereupon working up as described in Example 9 yields 16.5 parts of the compound of the formula $$(CH_3O)_2\overset{S}{\underset{\|}{P}}-SCH_2CONHC_2H_4OCH_3$$

described in Example 3.

Example 11

2 parts each of a condensation product obtained as described in any one of Examples 1 to 8 are mixed with 1 part of a condensation product from 1 molecular proportion of tertiary octylphenol and 8 molecular proportions of ethylene oxide and with 7 parts of isopropanol. The resulting clear solution is suitable for use as a liquid spray concentrate and can be emulsified by being poured into water.

(A) To determine the contact effect on aphids the following experiment was carried out with the use of liquid sprays containing, respectively, 0.08%, 0.04%, 0.02% and 0.01% of active principle.

Broad beans which were strongly infested with aphids were sprayed all over and after 48 hours the effect achieved was examined. When a 100% effect was observed, the plants were infected with fresh aphids and the effect examined after another 48 hours. The results obtained are summarized in the following Tables II and III.

TABLE II

| Conc. of active principle in liquid spray | Contact effect on aphids after 48 hours | | | | | | | | | | |
|---|---|---|---|---|---|---|---|---|---|---|---|
| | Ex. 1 | Ex. 2 | Ex. 3 | Ex. 5 | Ex. 6a | Ex. 6b | Ex. 6c | Ex. 6d | Ex. 7 Table I Comp. 4 | Ex. 7 Table I Comp. 7 | Ex. 7 Table I Comp. 8 |
| 0.08% | + + | + + | + + | + + | + + | + + | + + | + + | + + | + + | + + |
| 0.04% | + + | + + | + + | + + | + + | + + | + + | + + | + + | + + | + + |
| 0.02% | + + | + + | + + | + + | + + | + + | + + | + + | + + | + + | + + |
| 0.01% | + + | + + | + + | + + | + + | + + | + + | + + | + + | + + | + + |

TABLE III

| Conc. of active principle in liquid spray | Contact effect 48 hours after reinfestation | | | | | | | | | | |
|---|---|---|---|---|---|---|---|---|---|---|---|
| | Ex. 1 | Ex. 2 | Ex. 3 | Ex. 5 | Ex. 6a | Ex. 6b | Ex. 6c | Ex. 6d | Ex. 7 Table I Comp. 4 | Ex. 7 Table I Comp. 7 | Ex. 7 Table I Comp. 8 |
| 0.08% | + + | / / | + + | + + | + + | + + | + + | + + | + + | + + | + + |
| 0.04% | / / | − − | + + | + + | + + | + + | + + | + + | / / | + + | / − |
| 0.02% | / / | − − | − − | + + | + + | + + | + + | + / | / − | / / | / / |
| 0.01% | / − | − − | − − | + / | − − | + + | + + | / / | − − | − − | − − |

For each plant an identifying mark was used:
+ signifies that no live aphids were left,
− signifies insufficient or no effect,
/ signifies good effect, only few live aphids left.

(B) To determine the effect on aphids by diffusion through the leaves, the following experiment was carried out with liquid sprays containing, respectively, 0.08%, 0.04%, 0.02% and 0.01% of active principle.

Of broad beans which were infested with aphids only on the underside of the leaves, only the upper side of the leaves was sprayed with the above-mentioned liquid spray, and after 48 hours the effect on the underside of the leaves was inspected. The results thus obtained are summarized in the following Table IV:

TABLE IV

| Conc. of active principle in liquid spray | Effect on aphids by diffusion | | | | | | | | | |
|---|---|---|---|---|---|---|---|---|---|---|
| | Ex. 1 | Ex. 2 | Ex. 3 | Ex. 4 | Ex. 5 | Ex. 6 (a) | Ex. 6 (b) | Ex. 6 (c) | Ex. 6 (d) | Ex. 7 Table I Comp. 4 |
| 0.08% | + + + + | + + + + | + + + + | + + + + | + + + + | + + + + | + + + + | + + + + | + + + + | + + + + |
| 0.04% | + + + + | + + + + | + + + + | + + + + | + + + + | + / / / | + + + + | + + + + | + + + + | + + + + |
| 0.02% | + + / / | / / / / | + + + + | + + + + | + + + + | + / / − | + + + + | + + + + | + + + + | + + + + |
| 0.01% | − − − − | − − − − | / / / − | − − − − | / / − − | − − − − | + + + + | + + + + | + + + + | + + + / |

What is claimed is:
1. An organic phosphorus compound of the formula

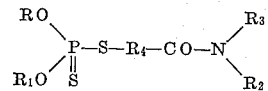

wherein R and $R_1$ each represents a radical selected from the group consisting of an alkyl radical containing at most 8 carbon atoms and a six-membered cyclic radical, $R_2$ represents a member selected from the group consisting of a radical of the formula

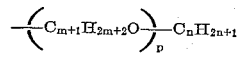

in which $m$, $n$ and $p$ each represents a whole number from 1 to 4 and a radical of the formula

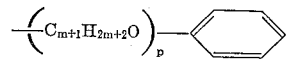

in which $m$ and $p$ each represents a whole number from 1 to 4, $R_3$ represents a member selected from the group consisting of a hydrogen atom, an alkyl radical containing at most 8 carbon atoms and the same radical as $R_2$, $R_4$ represents a member selected from the group consisting of the group —$CH_2$—, the group —$CH_2$—$CH_2$— and the group $$-\underset{\underset{R_5}{|}}{CH}-$$

in which $R_5$ represents alkyl radical containing at most 8 carbon atoms.

2. An organic phosphorus compound of the formula

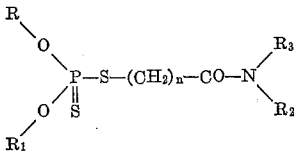

in which R and $R_1$ each represents an alkyl radical containing at most 4 carbon atoms, $R_2$ and $R_3$ each represents an alkyl radical containing 2 to 4 carbon atoms which is interrupted by an oxygen atom and $n$ represents a whole number of at the most 2.

3. The compound of the formula

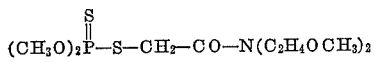

4. An organic phosphorus compound of the formula

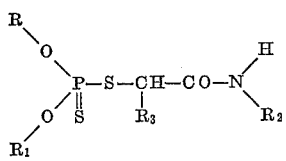

wherein R and $R_1$ each represents an alkyl radical containing at most 4 carbon atoms, $R_2$ represents an alkyl radical containing 2 to 4 carbon atoms which is interrupted by an oxygen atom, and $R_3$ represents an alkyl radical containing at the most 4 carbon atoms.

5. An organic phosphorus compound of the formula

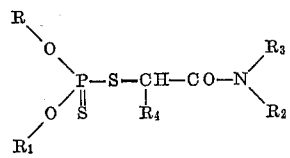

in which R and $R_1$ each represents an alkyl radical containing at most 4 carbon atoms, $R_2$ and $R_3$ each represents an alkyl radical containing 2 to 4 carbon atoms which is interrupted by an oxygen atom, and $R_4$ represents an alkyl radical containing at most 4 carbon atoms.

6. An organic phosphorus compound of the formula

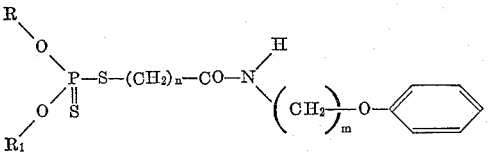

wherein R and $R_1$ each represents an alkyl radical containing at most 4 carbon atoms, $m$ represents a whole number of at the most 4 and $n$ represents a whole number of at the most 2.

7. The compound of the formula

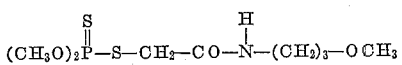

8. The compound of the formula

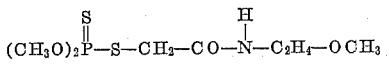

References Cited by the Examiner
UNITED STATES PATENTS

| | | | |
|---|---|---|---|
| 2,494,283 | 1/1950 | Cassaday et al. | 260—943 |
| 2,959,610 | 11/1960 | Young et al. | 260—943 |
| 2,968,591 | 1/1961 | Tracy | 167—22 |
| 3,080,274 | 3/1963 | Legator et al. | 167—22 |

CHARLES B. PARKER, *Primary Examiner.*

MORRIS LIEBMAN, IRVING MARCUS, LESLIE H. GASTON, *Examiners.*

FRANK M. SIKORA, JOSEPH P. BRUST, RICHARD L. RAYMOND, *Assistant Examiners.*